Figure 1:
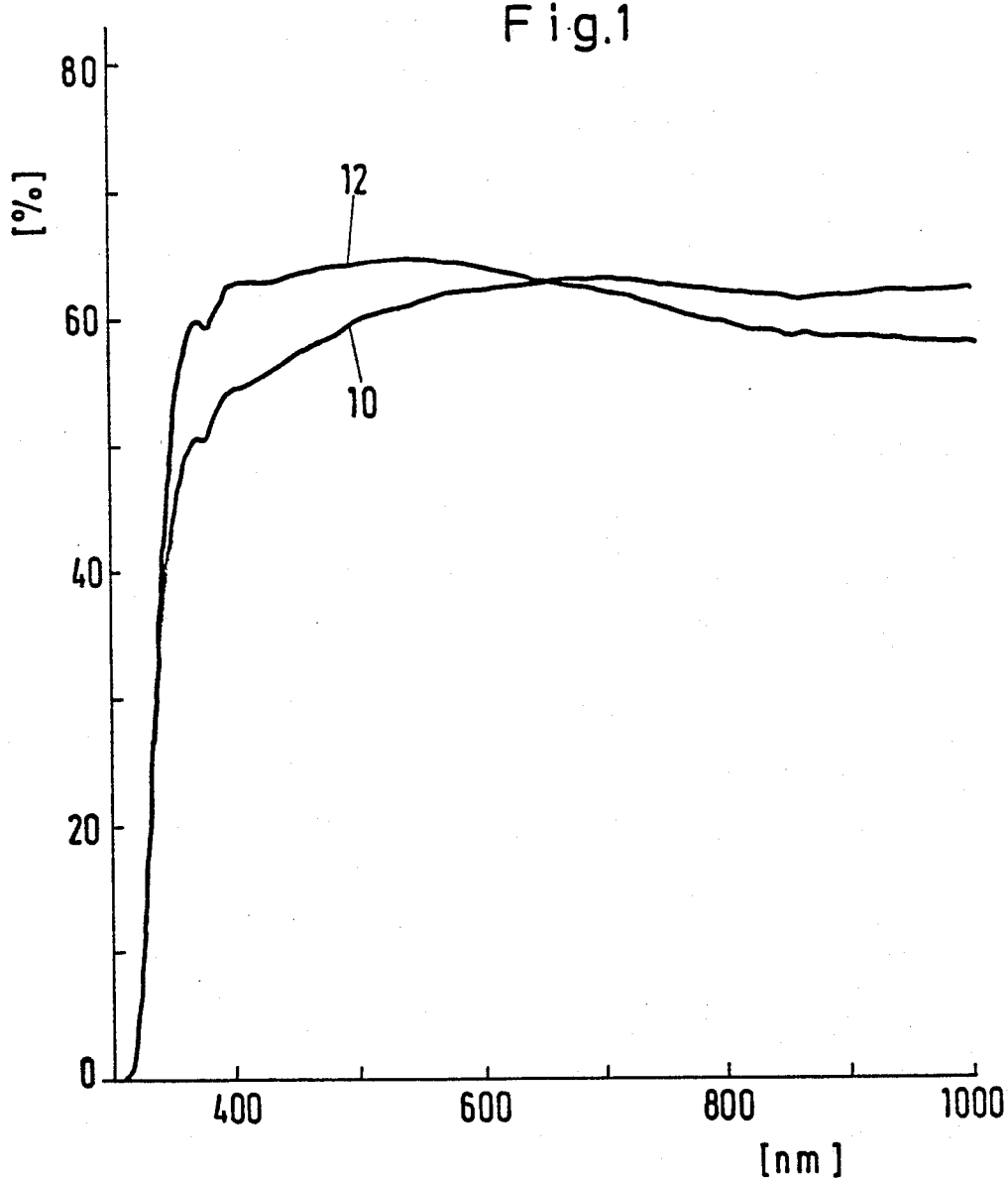

United States Patent [19]

Schmitte

[11] Patent Number: 4,816,054

[45] Date of Patent: Mar. 28, 1989

[54] PROCESS FOR THE MANUFACTURE OF A TOUGHENED AND/OR BENT SHEET OF GLASS, IN PARTICULAR SOLAR CONTROL GLASS SHEET

[75] Inventor: Franz-Josef Schmitte, Gelsenkirchen, Fed. Rep. of Germany

[73] Assignee: Flachglas Aktiengesellschaft, Fed. Rep. of Germany

[21] Appl. No.: 87,159

[22] Filed: Aug. 19, 1987

[30] Foreign Application Priority Data

Aug. 19, 1986 [DE] Fed. Rep. of Germany ....... 3628051

[51] Int. Cl.$^4$ .................... C03B 27/06; C03C 17/09
[52] U.S. Cl. ................................ 65/106; 65/60.2; 65/60.4; 65/114; 428/145
[58] Field of Search ............... 65/60.2, 60.4, 106, 65/107, 114; 428/145, 149, 143

[56] References Cited

U.S. PATENT DOCUMENTS

| 4,166,783 | 9/1979 | Turner | 204/192.13 |
| 4,170,460 | 10/1979 | Donley | 65/60.2 X |
| 4,329,379 | 5/1982 | Terneu et al. | 65/60.2 X |
| 4,404,235 | 9/1983 | Tarng et al. | 204/192.22 X |
| 4,668,270 | 5/1987 | Ramus | 65/106 |
| 4,715,879 | 12/1987 | Schmitte et al. | 65/60.2 |

FOREIGN PATENT DOCUMENTS

| 1283432 | 7/1972 | United Kingdom | 65/604 |
| 1524650 | 9/1978 | United Kingdom | 65/60.4 |

*Primary Examiner*—Robert L. Lindsay
*Attorney, Agent, or Firm*—Hill, Van Santen, Steadman & Simpson

[57] ABSTRACT

Process for the manufacture of a toughened and/or bent sheet of soda-lime silica glass with reduced transmission, in particular a solar control glass sheet, wherein at least one transmission-reducing coating having a considerable content of a metal or a metal alloy from the elements with atomic numbers 22 to 28 in the periodic table is applied in such a thickness on at least one side of a transparent glass base that the light transmission of the glass carrier provided with the transmission-reducing coating is between 10 and 90% of that of the glass base alone, and a thermal toughening and/or bending process is carried out in air at a temperature of 580° C. to 680° C., preferably 600° C. to 650° C., whereby the transmission-reducing coating is produced by magnetron cathode sputtering before the thermal toughening and/or bending process means of the joint application of the metal or metal alloy from the elements with atomic numbers 22 to 28 and of silicon as a metal silicide coating with a silicon content of at least 45 atom %.

10 Claims, 4 Drawing Sheets

PROCESS FOR THE MANUFACTURE OF A TOUGHENED AND/OR BENT SHEET OF GLASS, IN PARTICULAR SOLAR CONTROL GLASS SHEET

The invention relates to a process for the manufacture of a toughened and/or bent sheet of soda-lime silica glass with reduced transmission, in particular solar control sheet, whereby at least one transmission-reducing coating hving a considerable content of a metal or a metal alloy from the elements with the atomic numbers 22 to 28 in the periodic table is applied in such a thickness on at least one side of a transparent glass base that the light transmission of the glass base provided with the transmission-reducing coating is between 10 and 90% of that of the glass base alone, and a thermal toughening and/or bending process is carried out in air at a temperature of 580° to 680°, preferably 600° C. to 650° C.

Sheets of glass which comprises a surface coating of a metal or a metal alloy are used in the building sector and in automotive glazing in order to reduce the transmission of the uncoated glass base in certain spectral ranges. This takes place for example in order to achieve a light subduing effect and/or a solar control effect. Metals or metal alloys with atomic numbers 22 to 28 in the periodic system are thereby preferably used for the metal coating when sheets of glass wherein the coating does not significantly change the color in transmission and reflection are desired. The conventional soda-lime silica glass is thereby generally used as a glass base. This can, in addition, be mass-tinted, as in the case with bronze, grey and green glass. This mass-tinting already yields a basic solar control effect which is intensified in addition by the coating. Mass-tinted green glasses which distinguish themselves by a good sunscreen effect in conjunction with high light transmission are frequently used particularly in automotive glazing. Mixed glazings are particularly interesting in such applications, whereby some of the panes are additionally coated. Thus, for example, the windshield and the front side panes, which are subject to extensive legal provisions with regard to the minimum light transmission are executed with mass-tinted green glass. For the rear area of the vehicle, for which lower light transmission values are permissible, the same mass-tinted panes are used, these, however, being additionally coated in order to further increase the solar control effect. In many applications including the type described above, it is necessary to thermally toughen the glass base. The temperatures necessary for this are in the range from 580° C. to 680°, preferably in the range from 600° to 650° C. The same temperature range is also required when the sheets of glass, coming flat from glass production, are subjected to a bending process, whereby until now the application of the afore-mentioned neutral colored coatings ensued after the conclusion of the toughening or bending process and cooling of the sheets.

This procedure, namely carrying out the coating process after the toughening or bending process, has various disadvantages compared with a working method in which the coating would be applied first and the toughening or bending process would be subsequently carried out. Thus in the former case, only cut sizes can be coated, since, as known, toughened sheets cannot be cut. A further disadvantage of the procedure used until now lies in the fact that, as a result of the high temperatures of the toughening or bending process, impurities on the surface of the glass are frequently bonded so firmly thereto that they can no longer be removed in the subsequent surface cleaning preceding the coating process to the degree which would be desirable for the subsequent coating process. A process in which flat glass, particularly in the form of unit dimensions, could be coated firs and then toughened or bent would on the other hand have considerable advantages by comparison. This procedure has, however, not been possible until now because coatings composed of metals or metal alloys of the elements with atomic numbers 22 to 28 preferably used on account of colour neutrality because disturbing changes in the coating—in particular as a result of oxidation of the coatings—are caused by the required temperatures above 580° C. This is, for example, described in DE OS No. 17 71 223, from which it proceeds that metal coatings of the type described above are oxidized as a result of a heat treating stage at temperatures between 350° C. and 677.55°, whereby the transmission of the coatings is increased in particular in the near infrared and, thus, the solar control effect deteriorates in an undesirable way compared with those of non-oxidized metal coatings. Further, no adequate stability in the face of a heat load such as occurs in the toughening or bending process can be achieved given the combination of metal coatings of the said type with transparent oxide coatings as disclosed for example, by U.S. Pat. No. 3,846,152.

In order to overcome the said difficulties and to protect the said metals or metal alloys against oxidation during the toughening or bending process, it has already been suggested (German Patent Application No. P 35 44 840.7-45) that a metal oxide coating with a defined oxygen deficit be applied on the metal or metal alloy coating in a thickness of 10 nm to 100 nm, whereby no notable oxygen diffusion down to the metal or metal alloy coating can take place during the toughening or bending process. This solution had admittedly proven itself in principle, does however require that a sub-stoichiometric oxide coating must be additionally applied to the metal or metal oxide coating in a fashion difficult to control in terms of process technology, this additional oxide coating undesirably increasing the reflectivity of the coated sheet as seen from the glass side or at least undoing the anti-reflection effect of the one boundary surface that arises due to the application of the metal or metal alloy coating.

It is already known (DE-PS No. 25 26 209) to produce coatings of silicon for solar control purposes on glass, whereby these coatings have a dark brown tinted view in transmission and a high reflectivity of more than 50%, which is also not changed by a toughening process. Such coating systems are therefore not suitable for applications in the automotive sector because of the existing legal provisions on the reflection of the glass panes towards the outside.

DE-OS No. 21 38 034 also further discloses the manufacture of solar control coatings by using nitrides, carbides and silicides of the elements of the groups IV, V and VI and thus also elements with atomic numbers 22 to 28 in the periodic table, these coatings being relatively resistant to corrosion and, in the case of chromium silicide also being highly resistant to scratching (see U.S. Pat. No. 4,051,297). The said silicide coatings which were produced by DC or RF cathode sputtering, had, however, a strong color shift in transmission, as is apparent in the examples described in DE-OS No. 21 38

034, so that they are unsuitable for applications in which neutral-colored transmission-reducing coatings are required. From the current stand point, it can be assumed that the coatings described therein have a relatively high oxide content caused by the process, this having probably caused the colour shift. No teaching about the behavior of these coatings during bending and/or toughening sheets of glass coated in this way is apparent from the application.

The invention therefore aims to develop the process of the species initially cited in such a way that the above disadvantages are all avoided and in a simple, reproducible way neutral-colored, transmission-reducing coatings on glass whose optical properties likewise do not significantly change as a result of a toughening and/or bending process can be obtained in a simple reproducible way.

This problem is solved in accordance with the invention by the fact that the transmission-reducing coating is produced before the thermal toughening and/or bending process by means of a joint application of the metal or metal alloy from the elements with atomic numbers 22 to 28 and of silicon as a metal silicide coating with a silicon content of at least 45 atom % by means of magnetron cathode sputtering.

It can be arranged for the metal silicide coating be applied by sputtering a silicon-containing metal alloy target.

Alternatively, it can also be arranged for the metal silicide coating be produced by co-sputtering of a metal or of a silicon-free metal alloy cathode and of a silicon cathode.

A further embodiment of the invention proposes that a metal silicide coating having the composition $MeSi_n$, where $n=1$ or 2, be applied. Such stoichiometric compositions yield relatively homogeneous coatings which have properties which can be reproduced particularly well and are minimally susceptible to oxidation; coatings produced in accordance with this embodiment of the invention are also particularly resistant to corrosion and scratching.

It can thereby also be provided that a metal silicide coating having the composition $NiCrSi_2$, $FeSi_2$, $TiSi_2$ or $CoSi_2$ be applied.

Alternatively, it can also be arranged for a metal silicide coating having the composition $NiSi$ and/or $NiSi_2$, be applied. This embodiment of the invention has a particular advantage that nickel silicide targets can be produced well from the powder metallurgy point of view.

Finally, the invention is characterised in a preferred embodiment in that the metal silicide coating is applied in a thickness of 5 to 80 nm. With the metal silicide coating in this thickness range, coatings are produced which lead to a reduction in transmission of 10 to 90% with appropriate adjustment of the coating thickness, particularly also leading to a reduction in light transmission of the pane to approx. 40 to 60%. In this range, which is particularly attractive for automotive applications, anti-reflection of the glass seen from the uncoated side is also achieved, whilst, with greater coating thicknesses, the reflectivity of course increases again. A particular advantage of panes produced in accordance with the invention lies in this anti-reflection effect precisely in the preferred light transmission range.

The invention is based upon the surprising finding that metal silicide coatings which are applied in the manner claimed, first by magnetron cathode sputtering or the like and, second with the claimed silicon content, virtually do not change their optical properties in transmission and reflection during the toughening or bending process. In particular, the view in transmission remains grey-neutral, whereas the light reflectivity at that side of the glass facing away from the transmission-reducing coating is usually even somewhat reduced. This behavior is surprising to the extent that, as already stated, it is known that pure transition metal coatings oxidize in the toughening process and thus completely change their optical properties, whereas pure silicon coatings for the most part withstand the toughening process largely unchanged however have a very high reflectivity. The magnetron cathode sputtering or an equivalent process is essential to the invention for producing the said coatings, since sufficiently high sputtering rates can thereby be achieved, which prevent the reaction of the metal or silicon with the residual gas found in normal high vacuum systems from leading to oxide formation. Otherwise, in particular with conventional cathode sputtering, as applied for example in the process in accordance with DE-OS No. 21 38 034, the coatings are partly oxidized during the sputtering process, whereby the light transmission becomes too high, the view in transmission appears tinted and, in addition, the light reflectivity rises sharply.

If the metal silicide coating in accordance with the invention is produced by co-sputtering of one or several metals with the atomic numbers 22 to 28 and of a silicon target, care should be taken that the ratio of metal and silicon is correctly adjusted, for example by selecting the sputtering rate. It is simpler from the process technology point of view to apply the metal silicide in the desired composition on the basis of an alloy target, as in this case only one cathode with homogeneous material has to be controlled. The fact that a silicide alloy target cannot be produced with the same high degree of purity as the initial materials is insignificant when using the material as a color control coating, in contrast to semiconductor electronics in which the silicides are used as contact coatings.

The metal content of the silicide coating should for the rest not be much less than approximately 25 atom % in accordance with the invention, as undesirable optical properties in the silicon can appear with higher silicon contents. Further, it definitely lies within the concept of the invention that only parts of the glass carrier, for example, in the form of antiglare strips along one or more of the edges of automotive glazings be covered with inventively produced coatings in the implementation of the method of the invention.

Further characteristics and advantages of the invention will become apparent from the following description, in which the invention is set forth in greater detail with reference to the drawing on the basis of exemplary embodiments.

Figure 2:
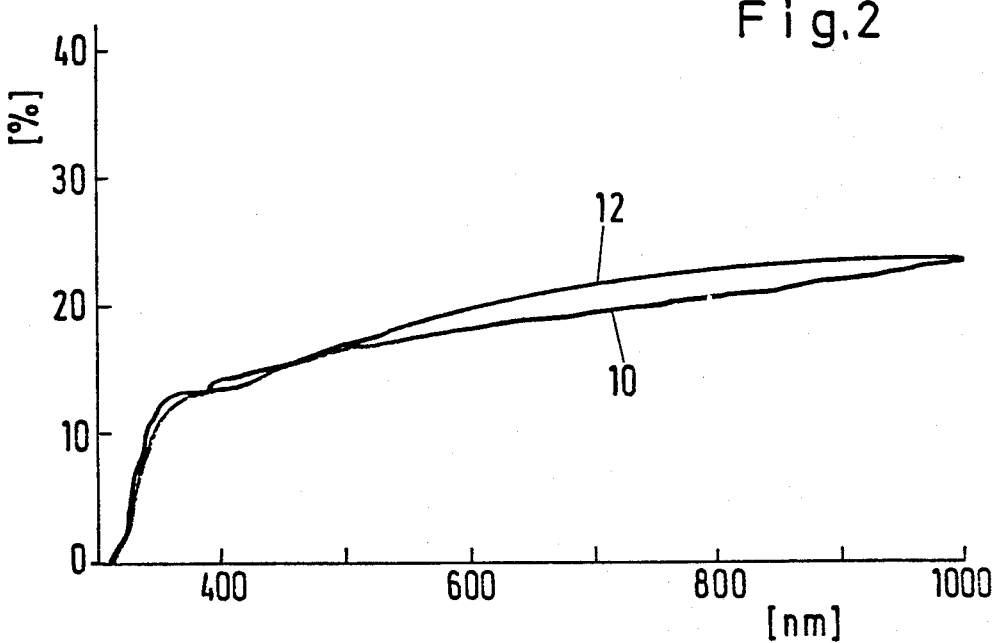
Figure 4:
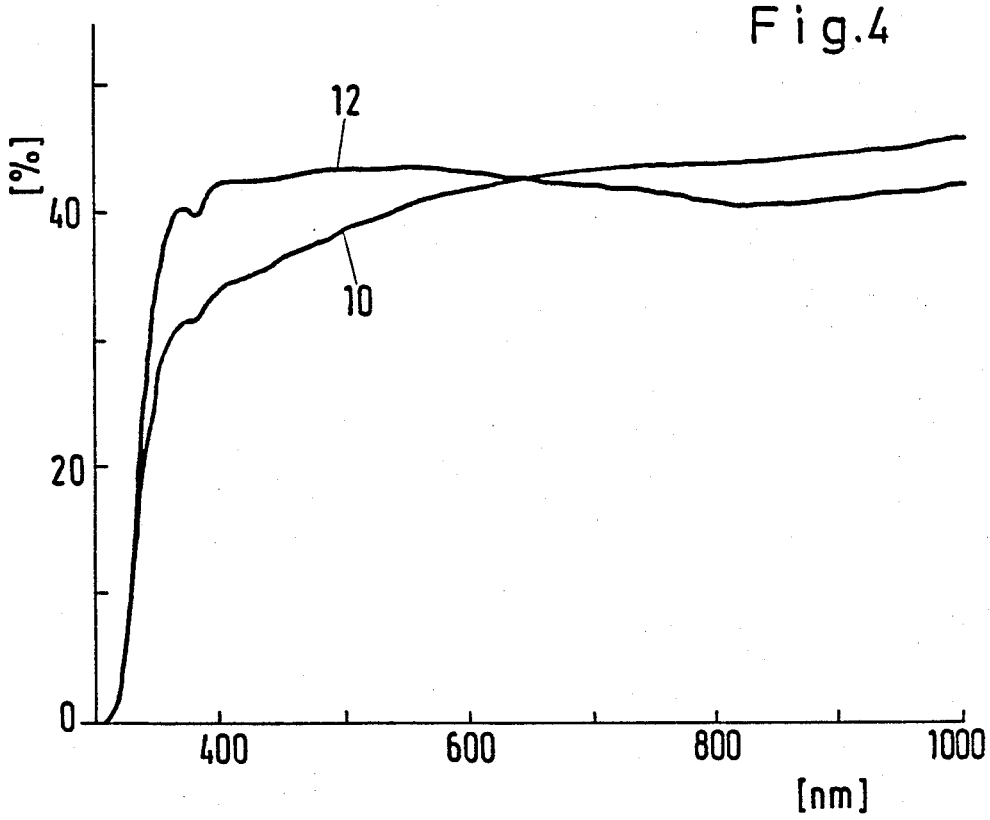
Figure 3:
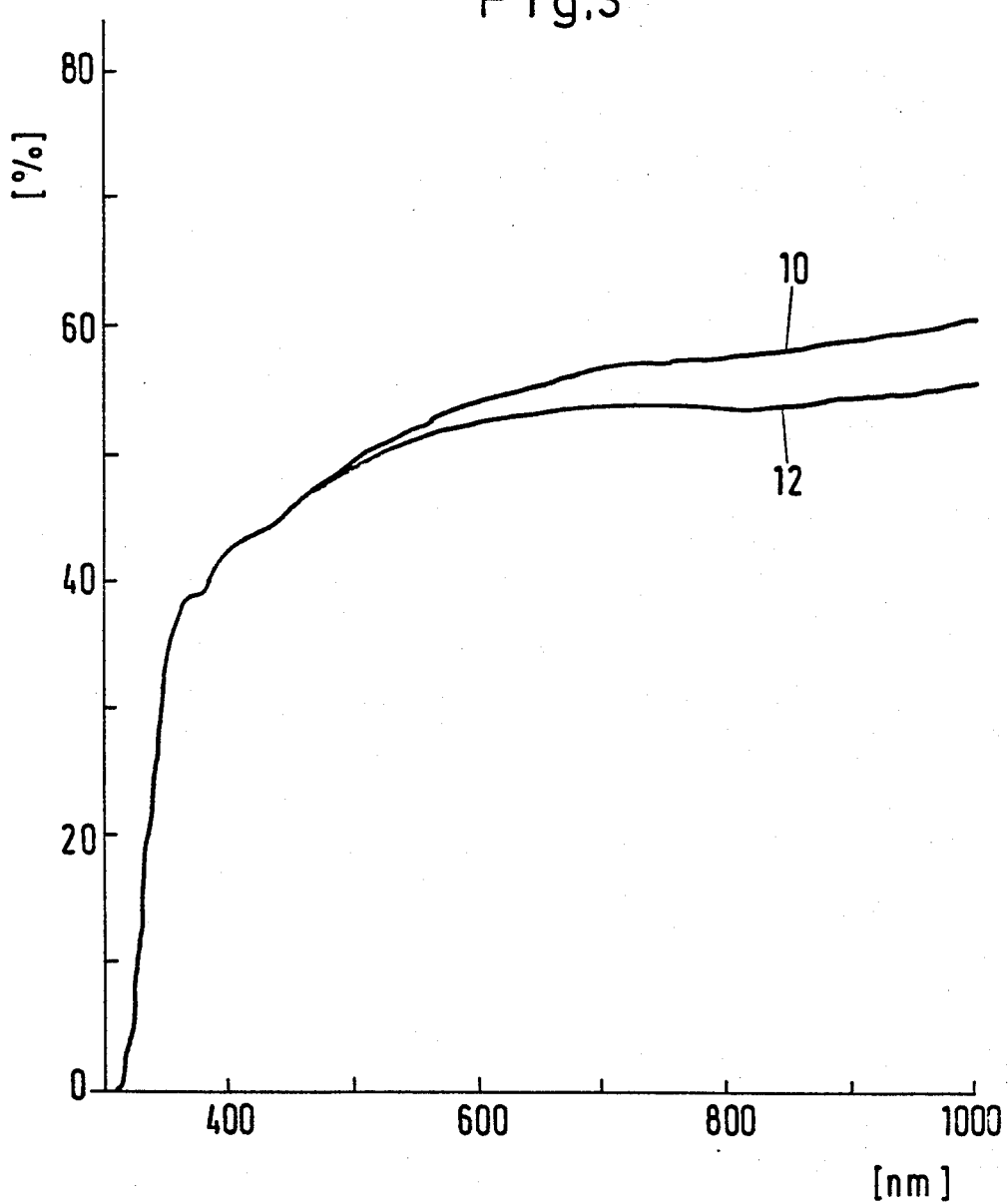
Figure 5:
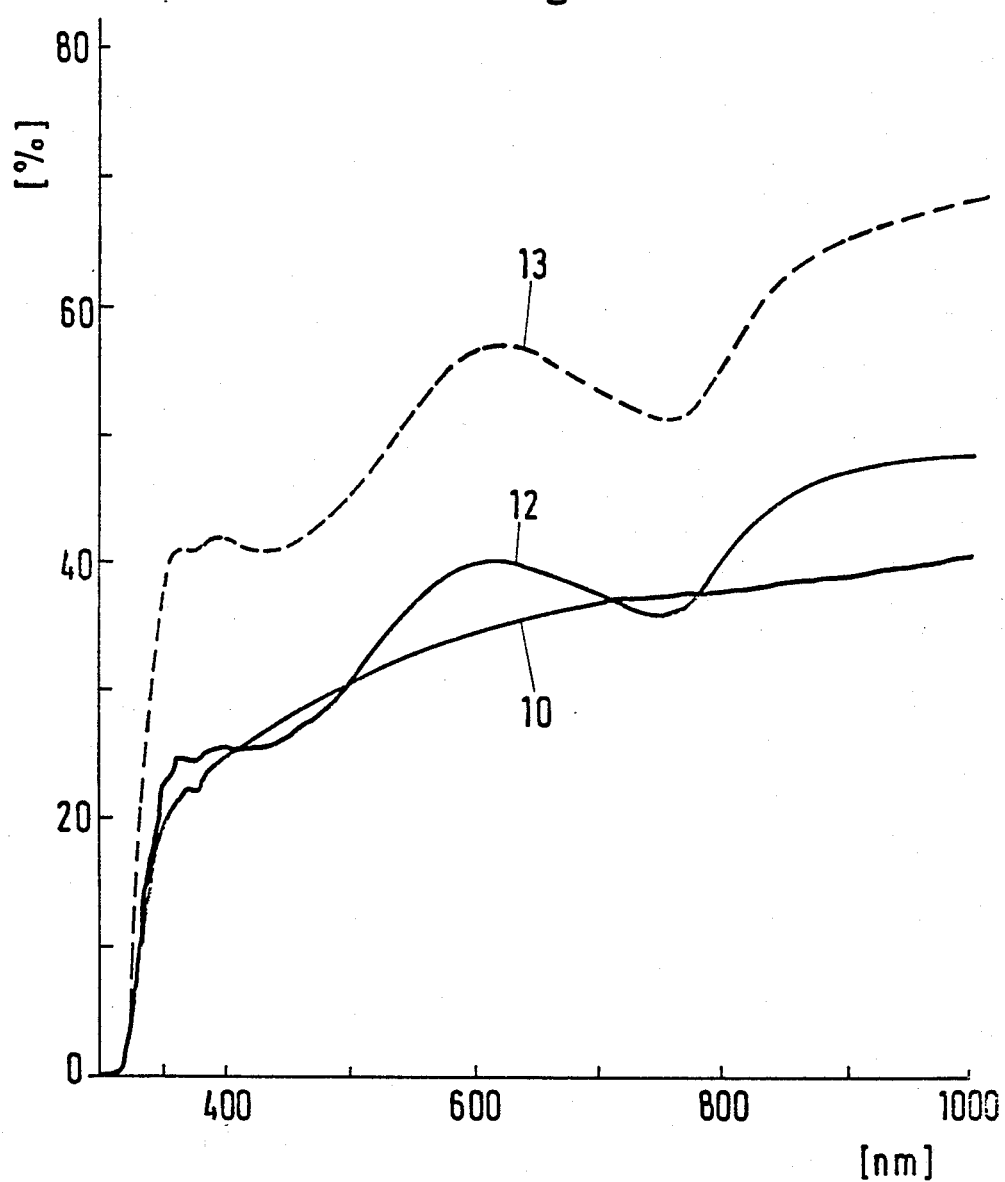

The following are shown:

FIG. 1 The spectral transmission of glass sheets produced in accordance with example I before (10) and after (12) a thermal treatment at toughening temperature;

FIG. 2 The spectral transmission of glass sheets produced in accordance with example II before (10) and after (12) a thermal treatment at toughening temperature;

FIG. 3 The spectral transmission of glass sheets produced in accordance with example III before (10) and after (12) a thermal treatment at toughening temperature;

FIG. 4 The spectral transmission of glass sheets produced in accordance with example IV before (10) and after (12) a thermal treatment at toughening temperatures; and FIG. 5 The spectral transmission of glass sheets produced in accordance with example V before (10) and after (12) a thermal treatment at toughening temperature, whereby the transmission curve (13) of a comparison glass sheets provided with cobalt oxide coating is additionally shown.

EXAMPLE I

In a vacuum coating system, which was equipped with coating devices for magnetron cathode sputtering, a coating with a light transmission of 60% was applied to a flat glass sheet measuring $10 \times 10$ cm$^2$ by means of simultaneous sputtering of a nickel target and of a silicon target in an argon atmosphere at a pressure of $6 \times 10^{-3}$ mbar. The sputtering rates were selected in such a way that the coating composition was approximately 30 atom % nickel and 70 atom % silicon. This was checked with the aid of Auger electron spectroscopy. The coated sheet was then subjected to a toughening process. Following this, the coated sheet continued to have a greyish neutral view in transmission. The light transmission was 62% and the coating had a high degree of resistance to corrosion and scratching. FIG. 1 shows that the thermal treatment at toughening temperature did not adversely change the neutral color of the pane and generally had only a slight effect upon the optical properties.

EXAMPLE II

The process was carried out as in example I; however in place of the targets made of nickel and silicon a target made of nickel silicide with a composition of 50.5% by weight Ni and 49.5% by weight Si was used. With this target, a coating was applied in such a thickness that the coated pane had a light transmission of 18.4%.

As a result of the toughening, the light transmission only increased to 20%. The properties of the coating were as in example I. FIG. 2 shows that the thermal treatment at toughening temperature has not adversely changed the neutral color of the pane and generally has only had a slight effect upon the optical properties.

EXAMPLE III

A metal-silicon coating was applied as in example I. However, instead of the nickel target a cobalt target was used. The sputtering rates were set in such a way that the coating composition was approximately 45 atom% cobalt and 55 atom% silicon and the light transmission of the coated sheet was 54%.

After the toughening process, a light transmission of 55% was obtained with otherwise unchanged optical properties (FIG. 3).

EXAMPLE IV

A coating with a light transmission of 35% was applied as in example I by the co-sputtering of a target made of chromium and of a target made of silicon in a magnetron sputtering system. The sputtering rates were in this case chosen in such a way that the coating composition had approx. 60 atom % silicon and 40 atom % chromium.

Even in the case of a sheet coated in this way, no change in the optical properties was established after the toughening process (FIG. 4).

EXAMPLE V (Comparative example:)

A coating with a light transmission of 32% was produced in a magnetron cathode sputtering system, as described in example I, by means of simultaneous sputtering of a cobalt target and of a silicon target. The coating parameters were chosen in such a way that the coating had a composition of approximately 65 atom % cobalt and 35 atom % silicon. Curve 10 in FIG. 5 shows the spectral curve of the transmission of this coating on 4 mm flat glass before the toughening process. It does not differ very significantly (apart from the level of transmission) from curve 10 in example III (FIG. 3). As a result of the toughening process, the light transmission increases to 39%. The view in transmission becomes highly umbral, and the reflection also has a yellowish brown color cast.

This is also reflected in the spectral curve of the transmissivity, which is shown in curve 12 in FIG. 5. The reason for the color cast lie in the proportion of cobalt in the coating being too high, which during the toughening process becomes cobalt oxide and cause the color changes.

To demonstrate this, the spectral transmissivity of a pure cobalt oxide coating is shown for comparison in curve 13 in FIG. 5. It shows the same characteristic structures which can also be found in curve 12.

The characteristics of the invention disclosed in the above description and in the claims can be essential both individually as well as in any given combination for realizing the invention in its various embodiments.

I claim:

1. Process for the manufacture of a toughened and/or bent sheet of soda-lime silica glass with reduced transmission, in particular a solar control glass sheet, wherein at least one transmission-reducing coating having a considerable content of a metal or a metal alloy from the elements with atomic numbers 22 to 28 in the periodic table is applied in such a thickness on at least one side of a transparent glass base that the light transmission of the glass base provided with the transmission-reducing coating is between 10 and 90% of that of the glass carrier alone, and a thermal toughening and/or bending process is carried out in air at a temperature of 580° C. to 680° C., preferably 600° C. to 650° C., characterized in that the transmission-reducing coating is produced by means of magnetron cathode sputtering before the thermal toughening and/or bending process by the joint application of the metal or the metal alloy from the elements with atomic numbers 22 to 28 and of silicon as a metal silicide coating with a silicon content of at least 45 atom %.

2. Process in accordance with claim 1, characterized in that the metal silicide coating is applied by sputtering a silicon-containing metal alloy target.

3. Process in accordance with claim 1, characterized in that the metal silicide coating is produced by co-sputtering of a metal or a silicon-free metal alloy cathode and of a silicon cathode.

4. Process in accordance with one of the previous claims, characterized in that a metal silicide coating having the composition MeSi$_n$, wherein n=1 or 2, is applied.

5. Process in accordance with claim 4, characterized in that a metal silicide coating having the composition $NiCrSi_2$, $FeSi_2$, $TiSi_2$, $CrSi_2$ or $CoSi_2$ is applied.

6. Process in accordance with claim 4, characterized in that a metal silicide coating having the composition $NiSi$ and/or $NiSi_2$ is applied.

7. Process in accordance with one of claims 1, 2 or 3 characterized in that the metal silicide coating is applied in a thickness of 5 to 80 nm.

8. Process in accordance with claim 2 characterized in that a metal silicide coating having the composition $MeSi_n$, wherein n=1 or 2, is applied.

9. Process in accordance with claim 5 characterized in that the metal silicate coating is applied in a thickness of 5 to 80 nm.

10. Process in accordance with claim 6 characterized in that the metal silicate coating is applied in a thickness of 5 to 80 nm.

* * * * *